United States Patent Office 3,139,428
Patented June 30, 1964

3,139,428
BENZYLIDENEYOHIMBANES
John Shavel, Jr., Mendham, George Bobowski, East Orange, and Maximilian von Strandtmann, Rockaway Township, N.J., assignors to Warner-Lambert Pharmaceutical Company, Morris Plains, N.J., a corporation of Delaware
No Drawing. Filed July 11, 1961, Ser. No. 123,119
11 Claims. (Cl. 260—240)

The present invention relates to new and novel yohimbone derivatives of the formula:

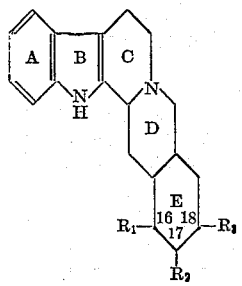

wherein $R_1$ is hydrogen, methyl or $R_3$; $R_2$ is hydrogen, keto, hydroxyl or a radical of the formula —$OR_4$ in which $R_4$ is the acyl radical of an aliphatic carboxylic acid containing 2 to 6 carbon atoms such as acetyl, propionyl, butyryl, valeryl, hexanoyl and the like, benzoyl or benzoyl substituted with 1, 2 or 3 lower alkyl, halo or lower alkoxy groups, for example p-methylbenzoyl, m-methylbenzoyl, o-methylbenzoyl, 3,4-dimethylbenzoyl, p-chlorobenzoyl, p-fluorobenzoyl, o-bromobenzoyl, m-chlorobenzoyl, 2,4-dichlorobenzoyl, p-methoxybenzoyl, 3,4,5-trimethoxybenzoyl, 3,4-dimethoxybenzoyl and the like; and $R_3$ is =$CHR_5$ or —$CH_2R_6$ in which $R_5$ is lower alkyl, furyl, phenyl, phenyl lower alkyl such as benzyl, phenethyl, phenylpropyl and the like, phenyl lower alkenyl such as cinnamyl, phenylpropenyl, phenylbutenyl and the like, methylenedioxyphenyl, or phenyl nuclearly substituted with one or two halo, lower alkyl, lower alkoxy or nitro groups such as p-chlorophenyl, 3,4-dichlorophenyl, m-methylphenyl, o-bromophenyl, p-ethylphenyl, p-fluorophenyl, p-methoxyphenyl, o-methoxyphenyl, m-butoxyphenyl, p-nitrophenyl, 3,4-dinitrophenyl, 2,4-dinitrophenyl, o-nitrophenyl, m-nitrophenyl and the like, and $R_6$ is lower alkyl, furyl, phenyl, phenyl lower alkyl, methylenedioxyphenyl, or phenyl nuclearly substituted with one or two halo, lower alkyl, lower alkoxy or amino groups. This invention also relates to new and novel methods of preparing these compounds and to the pharmaceutically acceptable non-toxic acid addition and quaternary ammonium salts thereof.

The terms "lower alkyl" and "lower alkoxy" as used herein refer to straight and branched chain aliphatic groups containing 1 to 6 carbon atoms. The term "lower alkenyl" refers to straight or branched chain aliphatic groups containing 2 to 6 carbon atoms and a single double bond.

The compounds of this invention bear the A, B, C, D and E rings as depicted in the above structural formula and are, generally, alkaloids of the yohimbane series. Depending upon the configuration of the hydrogen atom at the 3-position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing $R_1$, $R_2$ and $R_3$ substituents at the 16, 17 and 18 positions, respectively. Where the $R_1$ substituent is methyl or —$CH_2R_6$, the $R_2$ substituent is other than hydrogen or keto, and/ or the $R_3$ substituent is —$CH_2R_6$, various epimers are possible depending upon the configuration at the 16, 17 and/or 18 positions of the E ring. All such epimers are included within the scope of this invention.

The compounds of our invention have interesting and significant pharmacological activity and are particularly useful as anti-inflammatory agents. In addition, these compounds are valuable intermediates in the production of other compounds of the yohimbane series.

In the detailed description of this invention which follows, only the E ring of the yohimbane structure is shown for purposes of simplicity. By this simplified structure, the compounds of this invention are depicted as:

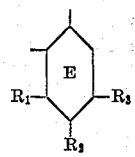

the A, B, C and D rings being present in all instances as illustrated in column 1 hereinabove.

We have now found that starting materials of the formula:

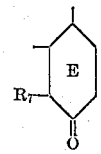

either in the pure state or in the state in which they are obtained in the course of synthetic processes, wherein $R_7$ is hydrogen or methyl, are converted to those compounds of our invention of the formula:

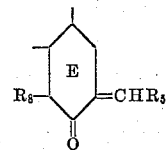

wherein $R_8$ is hydrogen, methyl or =$CHR_5$ and $R_5$ is as described hereinabove by treating a suspension of the starting material in ethanol or methanol with an aldehyde of the formula $R_5CHO$ in the presence of aqueous alkali.

In the reaction, the starting material 16-methylyohimbone is converted to products of the formula:

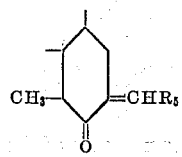

by refluxing the reaction mixture using ethanol as a solvent for about 1 to about 8 hours.

When the starting material is yohimbone, two products are possible, depending upon the reaction conditions. Refluxing in methanol for about 5 to about 50 hours or in ethanol for about 5 minutes to 1 hour favors the addition of one mol of the aldehyde to form products of the formula:

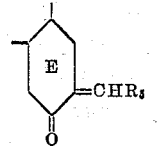

Refluxing in ethanol for 5 to 250 hours favors the addition of 2 mols of the aldehyde to form products of the formula:

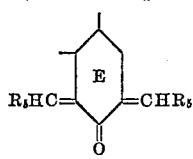

The reaction is carried out in the presence of aqueous alkali, for example an aqueous solution of an alkali metal hydroxide such as sodium hydroxide or potassium hydroxide.

Among the aldehydes of the formula $R_5CHO$ which may be reacted as described above are acetaldehyde, propionaldehyde, butyraldehyde, isobutyraldehyde, benzaldehyde, 3,4 - methylenedioxybenzaldehyde, p-methylbenzaldehyde, p-chlorobenzaldehyde, p-fluorobenzaldehyde, p-nitrobenzaldehyde, m-nitrobenzaldehyde, p-methoxybenzaldehyde, p-butoxybenzaldehyde, m-chlorobenzaldehyde, o-methylbenzaldehyde, o-methoxybenzaldehyde, furfural and the like.

We have also found that those compounds of our invention prepared as described above and having the formula:

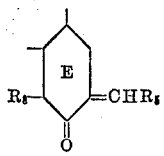

may be treated with a reducing agent, for example lithium aluminum hydride, potassium borohydride, sodium borohydride, lithium tri-(tert-butoxy)aluminum hydride and the like to form alcohols of the formula

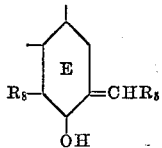

The reaction is carried out at a temperature between about 0° C. and 30° C., the temperature depending upon the particular reducing agent used, in an inert solvent such as methanol, ethanol, tetrahydrofuran and the like. At the conclusion of the reaction, which requires about 30 minutes to about 24 hours, the mixture is treated with water or dilute base and the precipitate, constituting the product is purified by crystallization.

We have also found that compounds of our invention of the formula:

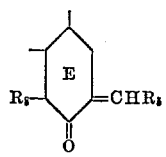

may be converted to compounds of the formula:

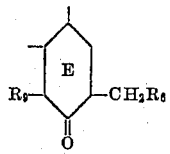

wherein $R_9$ is hydrogen, methyl or $-CH_2R_6$ by hydrogenation in the presence of such catalysts as platinum, palladium or mixtures thereof. The reaction is carried out under moderate pressure, about 30 to about 100 pounds per square inch, in a solvent such as methanol, ethanol, tetrahydrofuran or mixtures thereof. In this reaction, starting material wherein the $R_5$ substituent is phenyl lower alkenyl or phenyl nuclearly substituted with one or two nitro groups are converted respectively, to products wherein $R_6$ is phenyl lower alkyl or phenyl nuclearly substituted with one or two amino groups.

Treatment of compounds of the formula:

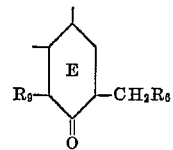

with a reducing agent, for example the various metal hydrides described hereinabove, results in the production of alcohols of the formula:

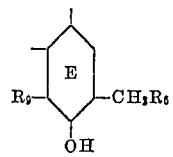

Alternately, such alcohols may also be obtained by the catalytic hydrogenation in the presence of platinum, palladium or mixtures thereof of compounds of the formula:

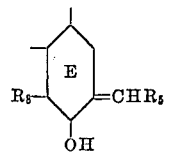

In addition, the 17-keto compounds of our invention having the formula:

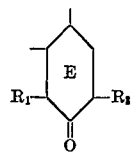

wherein $R_1$ is hydrogen, methyl or $R_3$ and $R_3$ is $=CHR_5$ or $-CH_2R_6$ may be subjected to a Wolff-Kishner reduction in accordance with the conventional conditions for this reaction to form compounds of the formula:

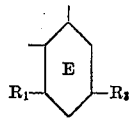

Finally, the 17-hydroxy substituted compounds of our invention having the formula:

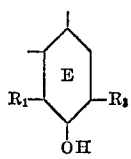

may be treated with an acid anhydride of the formula $R_4-O-R_4$ or an acyl halide of the formula $R_4-X$, where X is halogen, to form esters of the formula:

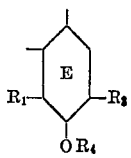

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicyclic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE 1

18-Isobutylideneyohimbone

Interaction of 50 g. yohimbone, 50 ml. isobutyraldehyde, and 10 g. potassium hydroxide in 1000 ml. absolute ethanol at room temperature for twenty hours, followed by fourteen additional hours of reaction during which 40 ml. more isobutyraldehyde is added in several small portions, results in complete conversion of the starting material. Refrigeration of the reaction mixture for 24 hours yields 45.6 g. of crystals, M.P. 243–246° dec., $[\alpha]_D^{25}$ −161° (pyridine, c.=0.87). One recrystallization from acetonitrile gives 32.6 g. of 18-isobutylideneyohimbone, M.P. 244–247° dec., $[\alpha]_D^{25}$ −206° (pyridine, c.=1.05).

*Analysis.*—Calc.: C, 79.27; H, 8.10; N, 8.04. Found: C, 79.64; H, 8.30; N, 8.35.

EXAMPLE 2

18-Benzylideneyohimbone

Refluxing of 100 g. yohimbone, 150 g. benzaldehyde (added portionwise throughout the period of refluxing), and 125 ml. 10% sodium hydroxide in 3200 ml. methanol for ten hours gives 79 g. of crystals, M.P. 253–255° dec., $[\alpha]_D^{25}$ −99° (chloroform, c.=0.67). Concentration of the filtrate to a volume of 500 ml. by distillation in vacuo gives 30.5 g. of a second crop, M.P. 253–254° dec., $[\alpha]_D^{25}$ −101° (chloroform, c.=0.55). Recrystallization from acetone gives pure 18-benzylideneyohimbone, M.P. 256–258° dec., $[\alpha]_D^{25}$ −97° (chloroform, c.=0.62), $[\alpha]_D^{25}$ −171° (pyridine, c.=0.58).

*Analysis.*—Calc.: C, 81.64; H, 6.85; N, 7.32. Found: C, 81.58; H, 6.94; N, 7.18.

EXAMPLE 3

16,18-Dibenzylideneyohimbone

A mixture of 1.0 g. of yohimbone, 1 ml. benzaldehyde (chlorine-free), and 1 ml. of 10% aqueous sodium hydroxide in 50 ml. of absolute ethanol is refluxed for four hours. Additional benzaldehyde (1 ml.) is added and the refluxing continued for two more hours. Cooling and filtration gives 0.2 g. of yellow crystals, M.P. 205–209°, $[\alpha]_D^{25}$ −196.7° (pyridine, c.=0.45). Recrystallization from methanol-acetone (1:1) gives pure 16,18-dibenzylideneyohimbone as a monomethanolote, M.P. 207–210°, $[\alpha]_D^{25}$ −195°, (pyridine, c.=.370). $[\alpha]_D^{25}$ −178° (chloroform, c.=.46).

*Analysis.*—Calc.: C, 81.24; H, 6.82; N, 5.57. Found: C, 81.65; H, 6.81; N, 5.42.

EXAMPLE 4

18-Benzylidene-16α-Methylyohimbone

A mixture of 10 g. 16α-methylyohimbone, 8 ml. benzaldehyde (chlorine-free), and 10 ml. of 10% aqueous sodium hydroxide in 250 ml. absolute ethanol is refluxed with stirring for eight hours. Cooling and filtration gives 6.5 g. of off-white crystals, M.P. 225–230°, which on recrystallization from acetone-methanol, gives white crystalline material, M.P. 224–227°, $[\alpha]_D^{25}$ −149° (pyridine, c.=.45). Two more recrystallizations from acetone-methanol (1:1), gives analytically pure 18-benzylidene-16α-methylyohimbone, M.P. 232–234°, $[\alpha]_D^{25}$ −151° (pyridine, c.=.635).

*Analysis.*—Calc.: C, 81.78; H, 7.12; N, 7.06. Found: C, 81.58; H, 7.15; N, 6.85.

EXAMPLE 5

18-(p-Methylbenzylidene)Yohimbone

Refluxing of 50 g. yohimbone, 70 ml. p-methylbenzaldehyde and 30 ml. 10% sodium hydroxide in 700 ml. methanol for eleven hours followed by the addition of 15 ml. more p-methylbenzaldehyde and twenty-four hours additional refluxing (during which an additional 15 ml. of the aldehyde is added) gives crystals which are recrystallized from acetonitrile to give 54.7 g. of material, M.P. 263–65° dec., $[\alpha]_D^{25}$ −160° (pyridine, c.=0.52), $[\alpha]_D^{25}$ −69° (chloroform, c.=0.54). Recrystallization from acetone gives pure 18-(p-methylbenzylidene)yohimbone, M.P. 258–260° dec., $[\alpha]_D^{25}$ −71° (chloroform, c.=0.5).

*Analysis.*—Calc.: C, 81.78; H, 7.12; N, 7.07. Found: C, 81.50; H, 7.21; N, 7.08.

EXAMPLE 6

18-(p-Methoxybenzylidene)Yohimbone

Refluxing 30 g. yohimbone, 50 ml. p-anisaldehyde, 15 ml. 10% sodium hydroxide, and 750 ml. methanol for 32 hours and recrystallization of the resulting crystals from acetonitrile gave 31.3 g. of product, M.P. 200–203° dec., $[\alpha]_D^{25}$ −135° (pyridine, c.=0.61). Recrystallization from acetonitrile gives pure 18-(p-methoxybenzylidene)-yohimbone, M.P. 201–204° dec., $[\alpha]_D^{25}$ −128° (pyridine, c.=0.5).

*Analysis.*—Calc.: C, 78.61; H, 6.84; N, 6.79. Found: C, 78.87; H, 6.88; N, 6.77.

EXAMPLE 7

18-(3,4-Methylenedioxybenzylidene)Yohimbone

Interaction of 5 g. yohimbone, 5 ml. piperonal, and 5 ml. 10% aqueous sodium hydroxide solution in 150 ml. methanol at reflux temperature for eight hours followed by eight additional hours of refluxing during which time there is added two more 5 ml. portions of piperonal results in complete conversion of the starting yohimbone. The solution is allowed to stand overnight at room temperature and the solvent evaporated in vacuo. The residue, an oil, is dissolved in 5% acetic acid, basified by the addition of ammonium hydroxide, and the precipitate which forms is collected and dried. Two recrystallizations from methanol give 1.2 g. of product, M.P. 151–159° dec., $[\alpha]_D^{25}$ −47° (chloroform, c.=0.5). Another recrystallization from methanol yields pure 18-(3,4-methylenedioxybenzylidene)yohimbone as the hemimethanolate, M.P. 147–154° dec., $[\alpha]_D^{25}$ −50° (chloroform, c.=0.5).

*Analysis.*—Calc.: C, 75.30; H, 6.21; N, 6.16. Found: C, 75.27; H, 6.81; N, 6.44.

EXAMPLE 8

18-(p-Chlorobenzylidene)Yohimbone

Interaction of 50 g. yohimbone, 50 ml. p-chlorobenzaldehyde, 15 ml. 10% sodium hydroxide, and 750 ml. methanol for 11 hours under reflux yields 43.2 g. of crystals, M.P. 251–252° dec., $[\alpha]_D^{25}$ −175° (pyridine, c.=0.58). Recrystallization from methanol gives pure 18-(p-chlorobenzylidene)yohimbone, M.P. 254–256° dec., $[\alpha]_D^{25}$ −178° (pyridine, c.=0.50), $[\alpha]_D^{25}$ −92° (chloroform, c.=0.55).

*Analysis.*—Calc.: C, 74.89; H, 6.04; N, 6.72; Cl, 8.50. Found: C, 74.73; H, 6.34; N, 6.54; Cl, 8.56.

EXAMPLE 9

18-(p-Nitrobenzylidene)Yohimbone

Refluxing 20 g. yohimbone, 20 g. p-nitrobenzaldehyde, 10 ml. 10% sodium hydroxide, and 2200 ml. methanol for two hours gives orange crystals which on recrystallization from acetonitrile yield 22 g. of product, M.P. 248–250° dec., $[a]_D^{25}$ —192° (pyridine, c.=0.59). Recrystallization from acetonitrile gives pure 18-(p-nitrobenzylidene)yohimbone, M.P. 253–254° dec., $[\alpha]_D^{25}$ —204° (pyridine, c.=0.5).

*Analysis.*—Calc.: C, 73.05; H, 5.89; N, 9.83. Found: C, 72.89; H, 5.89; N, 9.70.

EXAMPLE 10

18-Isobutylideneyohimbol

A solution of 10 g. lithium aluminum hydride in 200 ml. dry tetrahydrofuran is cooled to 0° and 50 ml. tert-butanol (dried over sodium) is added slowly with stirring. A solution of 10 g. 18-isobutylideneyohimbone prepared as described in Example 1 in 150 ml. dry tetrahydrofuran is then added dropwise with stirring at 0° over a period of 30 minutes. The solution is stirred at 0° for an additional hour and then allowed to come up to room temperature. The reaction mixture is treated cautiously with saturated aqueous sodium sulfate solution until all of the excess reagent is decomposed. Anhydrous sodium sulfate is then added, the mixture filtered, and the filtrate evaporated in vacuo to dryness. The residue is crystallized from benzene and then recrystallized from acetonitrile to yield 4.2 g. of 18-isobutylideneyohimbol, M.P. 223–229° dec., $[\alpha]_D^{25}$ —157 (pyridine, c.=0.5).

*Analysis.*—Calc.: C, 78.81; H, 8.63; N, 7.99. Found: C, 78.68; H, 8.75; N, 7.95.

EXAMPLE 11

18-Benzylidene-17β-Hydroxyyohibane

Interaction of 100 g. 18-benzylideneyohimbone prepared as described in Example 2, 20 g. potassium borohydride, and 1500 ml. methanol for 20 hours at room temperature gives a crude precipitate which is dissolved in 600 ml. glacial acetic acid. The solution is filtered, diluted with ice and basified with ammonia. The resulting solid is filtered off, washed with water, air dried (in the absence of light), and then dried in a vacuum pistol at 140° for four hours to give 97.5 g. of material, M.P. 275–282° dec., $[\alpha]_D^{25}$ —313° (pyridine, c.=0.62). Recrystallization from acetone gives 18 - benzylidene-17β-hydroxyyohimbane, M.P. 288–294° dec., $[\alpha]_D^{25}$ —326° (pyridine, c.=0.55).

*Analysis.*—Calc.: C, 81.21; H, 7.34; N, 7.29. Found: C, 81.26; H, 7.57; N, 7.42.

EXAMPLE 12

18-Benzylidene-17β-Hydroxyyohimbane Maleate

A hot solution of 0.5 g. 18-benzylidene-17β-hydroxyyohimbane in 50 ml. acetone is combined with 0.3 g. maleic acid in 5 ml. acetone. Cooling and filtration gives 0.3 g. of white crystals, M.P. 212–215°, $[\alpha]_D^{25}$ —254° (pyridine, c.=.64). On concentration to about 25 ml. and cooling an additional amount of 0.15 g. of white crystals, M.P. 215–216°, $[\alpha]_D^{25}$ —251° (pyridine, c.=.65) is obtained. Recrystallization from acetone gives the analytically pure maleate salt, M.P. 216–217°, $[\alpha]_D^{25}$ —254° (pyridine, c.=.600).

*Analysis.*—Calc.: C, 71.98; H, 6.44; N, 5.60. Found: C, 71.96; H, 6.14; N, 5.39.

EXAMPLE 13

18-Benzylidene-17β-Hydroxyyohimbane Hemicitrate

To a solution of 1.0 g. 18-benzylidene-17β-hydroxyyohimbane and 0.7 g. citric acid monohydrate in 40 ml. of methanol-acetone (1:1), is added 50 ml. ethyl acetate. Cooling and filtration gives 0.25 g. of white crystals, M.P. 190–200°, $[\alpha]_D^{25}$ —251° (pyridine, c.=.55). Recrystallization from acetone gives the analytically pure hemicitrate salt as a hemihydrate, M.P. 190–200°, $[\alpha]_D^{25}$ —251° (pyridine, c.=.62, l.=1).

*Analysis.*—Calc.: C, 71,14; H, 7.00; N, 5.72. Found: C, 71.11; H, 7.02; N, 5.89.

EXAMPLE 14

18-Benzylidene-17β-Hydroxyyohimbane Succinate

Succinic acid (0.3 g. in 5 ml. hot acetone is added to a hot solution of 0.5 g. 18-benzylidene-17β-hydroxyyohimbane in 40 ml. hot acetone. Upon cooling 0.3 g. of white crystals is obtained, M.P. 218–222°, $[\alpha]_D^{25}$ —245° (pyridine, c.=.60). Two recrystallizations from acetone-acetonitrile (1:1) gives the pure succinate salt, as the monoacetonate, M.P. 262–265°, $[\alpha]_D^{25}$ —247° (pyridine, c.=.615).

*Analysis.*—Calc.: C, 70.69; H, 7.19; N, 4.99. Found: C, 70.64; H, 7.26; N, 5.02.

EXAMPLE 15

17β-Acetoxy-18-Benzylideneyohimbane

A solution of 1.0 g. of 18-benzylidene-17β-hydroxyyohimbane prepared as described in Example 11 in 10 ml. glacial acetic acid, 10 ml. acetic anhydride and 1 ml. dry pyridine is allowed to stand for three hours at 25°. The mixture is then poured onto 100 g. crushed ice, made basic with ammonia, and filtered. The solid is taken up with ether, dried over sodium sulfate, and the solvent is removed in vacuo. Trituration with 5 ml. hot ethanol and cooling gives 0.7 g. of white crystals, M.P. 138–170°, $[\alpha]_D^{25}$ —252° (pyridine, c.=.65). Recrystallization from ethanol gives 17β-acetoxy-18-benzylideneyohimbane, M.P. 144–150°, $[\alpha]_D^{25}$ —255° (pyridine, c.=.705), $[\alpha]_D^{25}$ —164° (chloroform, c.=.535).

*Analysis.*—Calc.: C, 78.84; H, 7.09; N, 6.57. Found: C. 78.60; H, 7.06; N, 6.80.

EXAMPLE 16

17β-Benzoyloxy-18-Benzylideneyohimbane

Benzoyl chloride (2 ml.) is added dropwise to a solution of 4.0 g. of 18-benzylidene-17β-hydroxyyohimbane, prepared as described in Example 11, in 25 ml. dry pyridine. After standing at 0° for four hours, another 2.0 g. benzoyl chloride is added and the mixture is allowed to warm up gradually to room temperature and remain there for two hours. The brownish-red mixture is poured onto 200 g. of crushed ice, made basic with ammonia, and the brownish colored solid is filtered off. Trituration with 15 ml. of hot acetonitrile and cooling gives 3.6 g. of tan crystals, M.P. 148–155°, $[\alpha]_D^{25}$ —175° (pyridine, c.=.55). Ten recrystallizations from acetone-methanol gives 17β-benzoyloxy-18-benzylideneyohimbane, as the hemimethanolate, M.P. 151–158°, $[\alpha]_D^{25}$ —172° (pyridine, c.=.500), $[\alpha]_D^{25}$ —94° (chloroform, c.=.64).

*Analysis.*—Calc.: C, 79.72; H, 6.79; N, 5.55. Found: C, 79.54; H, 6.82; N, 5.73.

EXAMPLE 17

16,18-Dibenzylideneyohimbol

To a suspension of 4.0 g. of 16,18-dibenzylideneyohimbone, prepared as described in Example 3, in 250 ml. of methanol and 600 ml. of tetrahydrofuran is added 4.0 g. of potassium borohydride, portionwise, with stirring, at 35°. After a period of two hours everything went into solution which became almost colorless. Infrared spectra shows the absence of the ketone function. The solvent is then removed in vacuo. The residue is taken up with 200 ml. water, filtered, and washed with 150 ml. of 0.5% aqueous ammonia. After drying in vacuo at 110°, the white solid (4.0 g.) is recrystallized from acetone-methanol (2:1) to give white crystals (3.1 g.) of 16,18-dibenzylideneyohimbol, M.P. 175–185°, $[\alpha]_D^{25}$ —335° (pyridine, c.=.605), $[\alpha]_D^{25}$+64° (chloroform, c.=.610).

*Analysis.*—Calc.: C, 83.86; H, 6.82; N, 5.93. Found: C, 83.63; H, 7.02; N, 6.23.

EXAMPLE 18

*18 - Benzylidene - 17β-Hydroxy-16α-Methylyohimbane*

A mixture of 1.0 g. of 18-benzylidene-16α-methylyohimbone, prepared as described in Example 4, and 0.3 g. potassium borohydride in 40 ml. methanol is stirred at room temperature for four hours. Infrared spectra showed complete absence of the ketone function. The solvent is removed in vacuo. The residue is taken up with 50 ml. water, filtered, and washed with 100 ml. of 1% aqueous ammonia, giving 0.9 g. of white, fine crystals, M.P. 228–235°, $[\alpha]_D^{25}$ —358° (pyridine, c.=.45). Recrystallization from acetone gives 18-benzylidene-17β-hydroxy - 16α - methylyohimbone, M.P. 243–245°, $[\alpha]_D^{25}$ —370° (pyridine, c.=.66), $[\alpha]_D^{25}$ —218° (chloroform, c.=.355).

*Analysis.*—Calc.: C, 81.37; H, 7.59; N, 7.03. Found: C, 81.21; H, 7.59; N, 6.76.

EXAMPLE 19

*17β-Acetoxy-18-Benzylidene-16α-Methylyohimbane*

A solution of 1.0 g. of 18-benzylidene-17β-hydroxy-16α-methylyohimbane prepared as described in Example 18 in 4 ml. glacial acetic acid, 2 ml. acetic anhydride and 1 ml. anhydrous pyridine is allowed to stand at 25° for 20 hrs. The solution is poured onto 100 g. crushed ice, made basic with ammonia and filtered off. The solid is taken up with 20 ml. ether, dried over sodium sulfate, and the solvent is removed under nitrogen. Trituration of the residue with 8 ml. hot methanol and cooling, gives 0.75 g. of white, crystalline material, M.P. 215–217°, $[\alpha]_D^{25}$ —318° (pyridine, c.=.60). Further concentration of the mother liquor to about 3 ml. and cooling gives an additional 0.1 g. of material, M.P. 210–212°, $[\alpha]_D^{25}$ —309° (pyridine, c.=.605). Recrystallization of the material ($[\alpha]_D^{25}$ —318, pyridine), from methanol-acetone (5:1) yields 17β-acetoxy-18-benzylidene-16α-methylyohimbane, M.P. 217–219°, $[\alpha]_D^{25}$ —320° (pyridine, c.= .62), $[\alpha]_D^{25}$ —198° (chloroform, c.=.505).

*Analysis.*—Calc.: C, 79.06; H, 7.32; N, 6.36. Found: C, 78.83; H, 7.37; N, 6.45.

EXAMPLE 20

*18-(p-Methylbenzylidene)-17β-Hydroxyyohimbane*

Interaction of 15 g. 18-(p-methylbenzylidene)yohimbone, prepared as described in Example 5, and 7.5 g. potassium borohydride in 800 ml. methanol at room temperature and crystallization of the crude precipitate from acetonitrile gives 13.7 g. of product, $[\alpha]_D^{25}$ —335° (pyridine, c.=0.53). Recrystallization from acetonitrile gives 18-(p-methylbenzylidene)-17β-hydroxyyohimbane, M.P. 222–224° dec., $[\alpha]_D^{25}$ —340° (pyridine, c.=0.55).

*Analysis.*—Calc.: C, 81.39; H, 7.59; N, 7.03. Found: C, 81.33; H, 7.32; N, 6.91.

EXAMPLE 21

*18-(p-Chlorobenzylidene)-17β-Hydroxyyohimbane*

Interaction of 15 g. 18-(p-chlorobenzylidene)yohimbone, prepared as described in Example 8, and 4 g. potassium borohydride in 200 ml. methanol and crystallization of the crude precipitate from acetonitrile gives 14.9 g. of product $[\alpha]_D^{25}$ —354° (pyridine, c.=0.58). Recrystallization from acetonitrile yields 18-(p-chlorobenzylidene)-17β-hydroxyyohimbane, M.P. 224–226° dec., $[\alpha]_D^{25}$ —356° (pyridine, c.=0.62).

*Analysis.*—Calc.: C, 74.53; H, 6.50; N, 6.69; Cl, 8.46. Found: C, 74.40; H, 6.66; N, 6.88; Cl. 8.67.

EXAMPLE 22

*18-(p-Methoxybenzylidene)-17β-Hydroxyyohimbane*

Interaction of 20 g. 18-(p-methoxybenzylidene)yohimbone, prepared as described in Example 6, and 10 g. potassium borohydride in 800 ml. methanol and crystallization of the crude precipitate from acetonitrile gives 17.2 g. of product, M.P. 234–235° dec., $[\alpha]_D^{25}$ —352° (pyridine, c.=.67). Recrystallization from acetonitrile gives 18-(p-methoxybenzylidene)-17β-hydroxyyohimbane, M.P. 234–235°, $[\alpha]_D^{25}$ —350° (pyridine, c.=0.6).

*Analysis.*—Calc.: C, 78.28; H, 7.31; N, 6.76. Found: C, 78.02; H, 7.31; N, 6.72.

EXAMPLE 23

*18-(p-Nitrobenzylidene)-17β-Hydroxyyohimbane*

Interaction of 13 g. 18-(p-nitrobenzylidene)yohimbone and 7 g. potassium borohydride in 250 ml. methanol and crystallization of the crude precipitate from acetonitrile gives 8.3 g. of product, M.P. 210–212° dec., $[\alpha]_D^{25}$ —475° (pyridine, c.=0.51). Recrystallization from acetonitrile gives 18 - (p - nitrobenzylidene)-17β-hydroxyyohimbane, M.P. 205–207° dec., $[\alpha]_D^{25}$ —485° (pyridine, c.=0.3).

*Analysis.*—Calc.: C, 72.70; H, 6.34; N, 9.78. Found: C, 72.73; H, 6.24; N, 9.72.

EXAMPLE 24

*18-Isobutylyohimbone*

A solution of 10 g. 18-isobutylideneyohimbone, prepared as described in Example 1, in a mixture of 150 ml. tetrahydrofuran and 100 ml. methanol is hydrogenated at an initial pressure of 56 lb./sq. in. using 2 g. 10% palladium on carbon as catalyst. The hydrogenation is discontinued after 4.5 hours, 50 ml. chloroform are added and the catalyst is filtered off. The solvent is removed by distillation in vacuo and the residue is recrystallized twice from methanol to yield 5.2 g. of 18-isobutylyohimbone, with ¾ mol methanol, M.P. 235–237° dec., $[\alpha]_D^{25}$ —103° (pyridine, c.=0.5).

*Analysis.*—Calc.: C, 76,18; H, 8.88; N, 7.77. Found: C, 76.17; H, 8.88; N, 7.87.

EXAMPLE 25

*18-Benzylyohimbone*

A solution of 6.7 g. 18-benzylideneyohimbone, prepared as described in Example 2, in 25 ml. tetrahydrofuran and 75 ml. methanol is hydrogenated at an initial pressure of 60 lb./sq. in., using 1.0 g. 10% palladium on charcoal as catalyst. The hydrogenation is discontinued after 18 hours, 30 ml. chloroform are added to dissolve the crystals which had precipitated, and the catalyst is filtered off. The solvent is removed by distillation in vacuo and the residue is triturated with 30 ml. absolute ethanol. Filtration yields 4.2 g. of solids, M.P. 216–226° dec., $[\alpha]_D^{25}$ —128° (pyridine). Recrystallization three times from absolute ethanol yields 18-benzylyohimbone as the hemiethanolate, M.P. 225–232° dec., $[\alpha]_D^{25}$ —69° (pyridine, c.=0.75).

*Analysis.*—Calc.: C, 79.57; H, 7.67; N, 6.87. Found: C, 79.11; H, 7.77; N, 6.73.

EXAMPLE 26

*18-Benzyl-16α-Methylyohimbone*

A solution of 8.0 g. of 18-benzylidene-16α-methylyohimbone, prepared as described in Example 4, in 120 ml. tetrahydrofuran (dist'd from LiAlH₄) and 80 ml. methanol, containing 1.0 g. of 10% palladium-on-charcoal, is shaken under 40 lbs./sq. in. hydrogen for 21 hours at room temperature. Infra red analysis shows complete reaction. The solid is filtered off and washed with 20 ml. of tetrahydrofuran. After the evaporation of the filtrate in vacuo, the residue is triturated with 20 ml. methanol-acetonitrile (1:1), giving 5.0 g. of white crystals, M.P. 240–243°, $[\alpha]_D^{25}$ —102° (pyridine, c.=.60). Recrystallization from acetone-methanol (1:1) gives 18-benzyl-16α-methylyohimbone, M.P. 244–246°, $[\alpha]_D^{25}$ —104° (pyridine, c.=.615), $[\alpha]_D^{25}$ —33° (chloroform, c.=.72).

Analysis.—Calc.: C, 81.37; H, 7.59; N, 7.03. Found: C, 81.10; H, 7.68; N, 6.81.

EXAMPLE 27

18-Benzyl-17β-Hydroxyyohimbane

A mixture of 6.0 g. 18-benzylidene-17β-hydroxyyohimbane, prepared as described in Example 11, and 0.8 g. 10% palladium on charcoal in 120 ml. dry tetrahydrofuran and 130 ml. methanol is stirred at 25° under hydrogen (one atmosphere) for fifteen hours. 392 ml. of hydrogen are used up (20% excess over the theoretical amount). The solid is filtered off and the filtrate is evaporated to dryness in vacuo. Trituration of the residue with 15 ml. hot acetone and cooling gives 3.7 g. white crystals, M.P. 250–256°, $[\alpha]_D^{25}$ —230° (pyridine, c.=.625). Upon treatment of the mother liquor with charcoal and concentration to about 10 ml., an additional crop of 0.3 g. white crystals, M.P. 245–253°, $[\alpha]_D^{25}$ —226° (pyridine, c.=.41), is obtained. Total yield 4.0 g. (67%). One recrystallization from acetone gives 18-benzyl-17β-hydroxyyohimbane, M.P. 258–260°, $[\alpha]_D^{25}$ —231° (pyridine, c.=.60), $[\alpha]_D^{25}$ —162° (chloroform, c.=.41).

Analysis.—Calc.: C, 80.79; H, 7.82; N, 7.25. Found: C, 80.69; H, 8.07; N, 6.98.

EXAMPLE 28

16,18-Dibenzylyohimbol

A suspension of 1.8 g. of 16,18-dibenzylideneyohimbol, prepared as described in Example 17, and 0.3 g. of 10% palladium on charcoal (pre-reduced) in 100 ml. of methanol is stirred under the hydrogen pressure of one atmosphere. The hydrogen uptake stopped abruptly when 200 ml. are used up (15% excess), after ninety minutes. The catalyst is filtered off, washed with 30 ml. acetone, and the solvent is removed from the filtrate in vacuo. The orange colored residue is recrystallized from acetone giving 1.1 g. of white crystals, M.P. 110–120°, $[\alpha]_D^{25}$ —185° (pyridine, c.=.510). Repeated recrystallizations from acetone give 16,18-dibenzylyohimbol, M.P. 115–130°, $[\alpha]_D^{25}$ —189° (pyridine, c.=.625), $[\alpha]_D^{25}$ —129° (chloroform, c.=.500).

Analysis.—Calc.: C, 83.15; H, 7.61; N, 5.88. Found: C, 83.13; H, 8.09; N, 5.65.

EXAMPLE 29

18α-Benzyl-17β-Hydroxy-16α-Methylyohimbane

A suspension of 3.2 g. of 18-benzyl-16α-methylyohimbone, prepared as described in Example 26, and 1.0 g. of potassium borohydride in 150 ml. of methanol is stirred for three and a half hours at 35°. The solvent is removed in vacuo from a steam bath, and the yellow residue taken up with 200 ml. of water. The off-white solid is filtered, washed with 500 ml. of 0.05% aqueous ammonia, and dried in vacuo at 100° for five hours. The off-white, glassy solid (3.2 g.) is dissolved in acetone, filtered to remove the mechanical impurities, and the solvent is removed from the filtrate in vacuo. Recrystallization from ethanol gives 18α-benzyl-17β-hydroxy-16α-methylyohimbane, M.P. 130–140°, $[\alpha]_D^{25}$ —81°, (pyridine, c.=.65), $[\alpha]_D^{25}$ —44° (chloroform, c.=.575).

Analysis.—Calc.: C, 80.96; H, 8.05; N, 6.99. Found: C, 80.69; H, 8.01; N, 7.05.

EXAMPLE 30

18-Benzylideneyohimbane

A solution of 5.0 g. 18-benzylideneyohimbone, 1.5 g. solid sodium hydroxide, 20 ml. anhydrous hydrazine, and 350 ml. diethylene glycol is refluxed for one hour. The reflux condenser is then removed and the heating continued for three hours, the temperature rising to 199–201°. (The excess hydrazine and water are thus removed from the reaction mixture). Infra red spectra show complete absence of the ketone function. The mixture is poured onto 500 g. ice-water and filtered off. The solids are taken up with chloroform, dried over sodium sulfate, and the solvent removed in vacuo. Trituration of the residue with 20 ml. hot methanol and cooling gives 2.3 g. of tan colored crystals, M.P. 243–252°, $[\alpha]_D^{25}$ —53° (pyridine, c.=.60). Recrystallization from methanol-acetone (2:1) gives white crystals of 18-benzylideneyohimbane, M.P. 254–57°, $[\alpha]_D^{25}$ —54° (pyridine, c.=.605), $[\alpha]_D^{25}$ —34° (chloroform, c.=.55).

Analysis.—Calc.: C, 84.74; H, 7.66; N, 7.60. Found: C, 84.95; H, 7.86; N, 7.46.

EXAMPLE 31

18-Furfurylidene-16α-Methylyohimbone

A mixture of 10 g. 16α-methylyohimbone, 500 ml. tetrahydrofuran, 50 ml. furfural and 100 ml. 33% sodium hydroxide is stirred for 24 hours under nitrogen. The solution is filtered, and after separation, the organic layer is dried over sodium sulfate, treated with few drops of glacial acetic acid and concentrated in vacuo. The crystalline precipitate is collected and recrystallized from ethanol. Yield: 11.5 g. of 18-furfurylidene-16α-methylyohimbone, M.P. 228–230°, $[\alpha]_D^{25}$ —167° (chloroform, c.=0.6).

Analysis.—Calc.: C, 77.69; H, 6.78; N, 7.25. Found: C, 77.72; H, 6.98; N, 7.11.

EXAMPLE 32

18-Furfurylidene-16α-Methylyohimbol

To a solution of 1 g. 18-furfurylidene-16α-methylyohimbone prepared as described in Example 31, in 100 ml. methanol-tetrahydrofuran (1:1) mixture is added portionwise 0.5 g. KBH₄. After stirring for 20 hrs. the solution is evaporated in vacuo. The residue is dissolved in a minimum of acetic acid and the solution diluted with several volumes of water. After filtration and basification with ammonia, the precipitate is collected, washed with water, dried and recrystallized from methanol. Yield: 0.8 g. of 18-furfurylidene-16α-methylyohimbol as a hydrate, M.P. 148–150°, $[\alpha]$ —296° (chloroform, c.=1.1).

Analysis.—Calc.: C, 73.86; H, 7.44; N, 6.89. Found: C, 73.90; H, 7.36; N, 6.76.

EXAMPLE 33

18-Furfuryl-16α-Methylyohimbone

A solution of 4 g. of 18-furfurylidene-16α-methylyohimbone prepared as described in Example 31, in 300 ml. ethanol-tetrahydrofuran (6:4) is hydrogenated in the presence of 1 g. of 5% palladium on charcoal at room temperature and 2 atm. for 12 hrs. The solution is freed from catalyst by filtration and concentrated in vacuo. The precipitated crystalline product is recrystallized from ethanol-tetrahydrofuran (9:1). Yield: 3 g. of 18-furfuryl-16-methylyohimbone as a hemihydrate, M.P. 190–192°, $[\alpha]_D^{25}$ —65° (chloroform, c.=0.7).

Analysis.—Calc.: C, 75.53; H, 7.61; N, 7.05. Found: C, 75.43; H, 7.99; N, 7.11.

EXAMPLE 34

18-(3,4-Dichlorobenzylidene)Yohimbone

Interaction of 10 g. yohimbone, 15 g. 3,4-dichlorobenzaldehyde, 10 ml. 10% sodium hydroxide, and 400 ml. methanol for 10 hrs. under reflux gives crystals which are redissolved in dilute acetic acid. The solution is made basic with ammonia and the resulting precipitate is washed with water, air dried, and refluxed for 30 minutes with 1000 ml. methanol. The insoluble solid is filtered off and dried in vacuo at 110° for 3 hrs.; Yield: 14.4 g., M.P. 280–285° dec., $[\alpha]_D^{25}$ —182° (pyridine, c.=0.63). A hot filtered solution of 1 g. in 1000 ml. of a 50–50 mixture of methanol and methylene chloride is

13 distilled at atmospheric pressure to a volume of 500 ml. On standing at room temperature there are obtained crystals of 18-(3,4-dichlorobenzylidene)yohimbone, M.P. 292–294° dec., $[\alpha]_D^{25}$ —198° (pyridine c.=0.500).

Analysis.—Calc.: C, 69.18; H, 5.36; N, 6.21; Cl, 15.71. Found: C, 69.17; H, 5.48; N, 6.02; Cl, 15.89.

EXAMPLE 35

*18-(3,4-Dichlorobenzylidene)-17β-Hydroxyyohimbane*

Interaction of 10.27 g. 18-(3,4-dichlorobenzylidene)yohimbone and 5 g. potassium borohydride in 200 ml. methanol at room temperature followed by two recrystallizations of the crude product from ethanol gives 7.5 g. of 18-(3,4-dichlorobenzylidene)-17β-hydroxyyohimbane, M.P. 204–208° dec., $[\alpha]_D^{25}$ —323° (pyridine, c.=0.6).

Analysis.—Calc.: C, 68.87; H, 5.78; N, 6.18; Cl, 15.64. Found: C, 68.83; H, 5.83; N, 6.25; Cl, 15.40.

EXAMPLE 36

*18-(p-Bromobenzylidene)Yohimbone*

Interaction of 29.4 g. yohimbone, 25 g. p-bromobenzaldehyde, 15 ml. 10% sodium hydroxide, and 700 ml. methanol for nine hours under reflux gives 28.5 g. of crude product. This is dissolved in dilute acetic acid and the resulting solution is decanted from the dark gummy material which remained insoluble. It is basified by the addition of aqueous ammonium hydroxide and the mixture extracted with chloroform. The dried chloroform solution is distilled in vacuo to dryness to give a residue which is recrystallized from methanol to yield 22.9 g. of material, M.P. 258–262° dec., $[\alpha]_D^{25}$ —160° (pyridine, c.=0.55). Recrystallization from methanol gives 18-(p-bromobenzylidene)yohimbone, M.P. 264–267° dec., $[\alpha]_D^{25}$ —167° (pyridine, c.=0.6).

Analysis.—Calc.: C, 67.68; H, 5.46; N, 6.07; Br, 17.32. Found: C, 67.86; H, 5.44; N, 6.07; Br, 17.58.

EXAMPLE 37

*18-(p-Bromobenzylidene)-17β-Hydroxyyohimbane*

Interaction of 13.5 g. 18-(p-bromobenzylidene)yohimbone and 10 g. potassium borohydride in 400 ml. methanol at room temperature and recrystallization of the crude product from acetonitrile gives 11.3 g. of material, M.P. 210–214° dec., $[\alpha]_D^{25}$ —339° (pyridine, c.=0.75). Another recrystallization from the same solvent yields 18-(p-bromobenzylidene)-17β-hydroxyyohimbane, M.P. 214–217° dec., $[\alpha]_D^{25}$ —346° (pyridine, c.=0.5).

Analysis.—Calc.: C, 67.38; H, 5.87; N, 6.04; Br, 17.24. Found: C, 67.07; H, 5.58; N, 6.20; Br, 17.16.

EXAMPLE 38

*18-(p-Fluorobenzylidene)Yohimbone*

Interaction of 25 g. yohimbone, 15 ml. p-fluorobenzaldehyde and 15 ml. 10% aqueous sodium hydroxide in 500 ml. refluxing methanol for twenty hours during which an additional 20 g. p-fluorobenzaldehyde is added portionwise gives after standing overnight at room temperature 9.9 g. of crystals, M.P. 220–222° dec., $[\alpha]_D^{25}$ —163° (pyridine, c.=0.52). Recrystallization from methanol gives 7.4 g. of 18-(p-fluorobenzylidene)yohimbone, M.P. 221–223° dec., $[\alpha]_D^{25}$ —153° (pyridine, c.=0.62).

Analysis.—Calc.: C, 77.97; H, 6.29; N, 7.00; F, 4.74. Found: C, 77.81; H, 6.53; N, 7.27; F, 4.28.

EXAMPLE 39

*18-(p-Fluorobenzylidene)-17β-Hydroxyyohimbane*

Interaction of 8.85 g. 18-(p-fluorobenzylidene)yohimbone and 5 g. potassium borohydride in 200 ml. methanol and recrystallization of the crude product from methanol gives 5.6 g. of 18-(p-fluorobenzylidene)-17β-hydroxyyohimbane, M.P. 260–262° dec., $[\alpha]_D^{25}$ —295° (pyridine, c.=0.6).

Analysis.—Calc.: C, 77.58; H, 6.76; N, 6.96; F, 4.72. Found: C, 77.76; H, 6.95; N, 7.26; F, 5.30.

EXAMPLE 40

*18-Cinnamylidene-17β-Hydroxyyohimbane*

Refluxing a methanol solution of yohimbone, cinnamaldehyde, and aqueous sodium hydroxide by the procedure described in Example 2, followed by treatment of the product with potassium borohydride in methanol by the procedure described in Example 11 yields 18-cinnamylidene-17β-hydroxyyohimbane, M.P. 239–240°, $[\alpha]_D^{25}$ —533° (pyridine, c.=0.6).

Analysis.—Calc.: C, 81.91; H, 7.36; N, 6.82. Found: C, 81.93; H, 7.10; N, 6.72.

EXAMPLE 41

*61,18-Dicinnamylideneyohimbone*

Refluxing a mixture of yohimbone, cinnamaldehyde and aqueous sodium hydroxide in ethanol by the procedure described in Example 3 yields 16, 18-dicinnamylideneyohimbone, M.P. 241–243°, $[\alpha]_D^{25}$ —478° (pyridine, c.=0.535).

Analysis.—Calc.: C, 85.02; H, 6.56; N, 5.36. Found: C, 85.23; H, 6.69; N, 5.46.

EXAMPLE 42

*16,18-Dicinnamylideneyohimbol*

Treatment of 16,18-dicinnamylideneyohimbone with potassium borohydride in methanol and tetrahydrofuran by the procedure described in Example 17 yields 16,18-dicinnamylideneyohimbol, M.P. 234–236°, $[\alpha]_D^{25}$ —508° (pyridine, c.=0.43).

In certain of the foregoing examples, a hydroxy or esterified hydroxy substituent at the 17 position, an assymmetric center with such substitution, has been arbitrarily assigned the β configuration. Such an assignment of configuration is believed sound on theoretical grounds by analogy to the reduction of yohimbone in which 17β-hydroxyyohimbane is known to be the predominant product.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

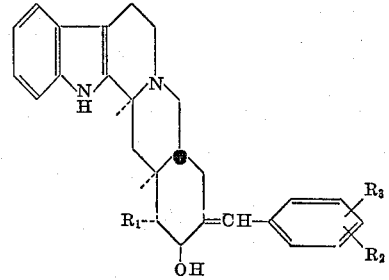

and

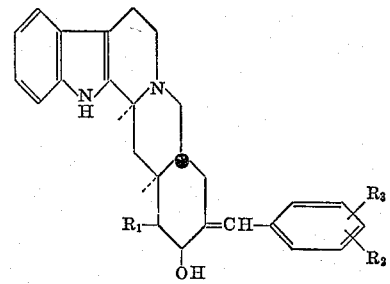

wherein $R_1$ is a member selected from the group consisting of hydrogen, lower alkyl and benzylidine, and $R_2$ and $R_3$ are each a member selected from the group consisting of hydrogen, lower alkyl, halogen, hydroxy, lower alkoxy and nitro, and the nontoxic acid addition and quaternary ammonium salts thereof with a compound of the group consisting of methyl iodide, ethyl bromide, n-benzyl bromide, benzyl chloride, methyl sulfate, ethyl sulfate, and methyl p-toluene sulfonate.

2. 18-benzylidene-17β-hydroxyyohimbane.
3. 16.18-dibenzylideneyohimbol.
4. 18-benzylidene-17β-hydroxy-16α-methylyohimbane.
5. 18-(p-methylbenzylidene)-17β-hydroxyyohimbane.
6. 18-(p-chlorobenzylidene)-17β-hydroxyyohimbane.
7. 18-(p-methoxybenzylidene)-17β-hydroxyyohimbane.
8. 18-(p-nitrobenzylidene)-17β-hydroxyyohimbane.
9. 18-(3,4-dichlorobenzylidene)-17β-hydroxyyohimbane.
10. 18-(p-bromobenzylidene)-17β-hydroxyyohimbane.
11. 18-(p-fluorobenzylidene)-17β-hydroxyyohimbane.

References Cited in the file of this patent

Cope et al.: Jour. Amer. Chem. Soc., vol. 63 (1941), pages 3456 to 3459.

Janot et al.: Bull. Soc. Chim., Fr. (1949), page 509.

Theilheimer: Syn. Meth. of Org. Chem., vol. 1 (1948), page 118.

Karrer et al.: Helv. Chim. Acta, vol. 35 (1952), page 1932.

Diassi et al.: Jour. Amer. Chem. Soc., vol. 80 (1958), page 3747.